Sept. 17, 1935.   N. G. POLGOV   2,014,635
CABLE TERMINATOR
Filed April 16, 1931
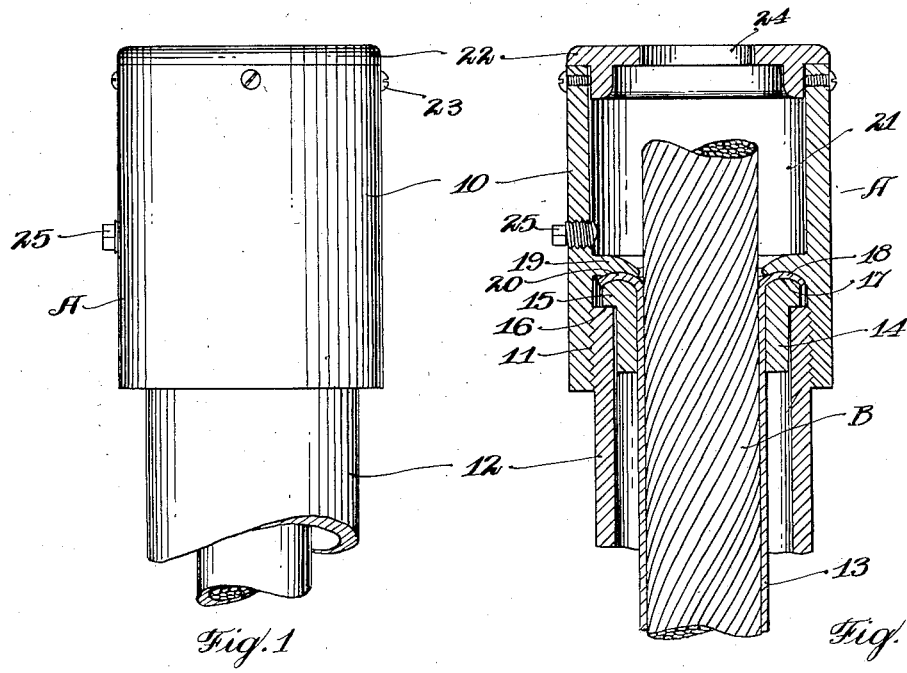
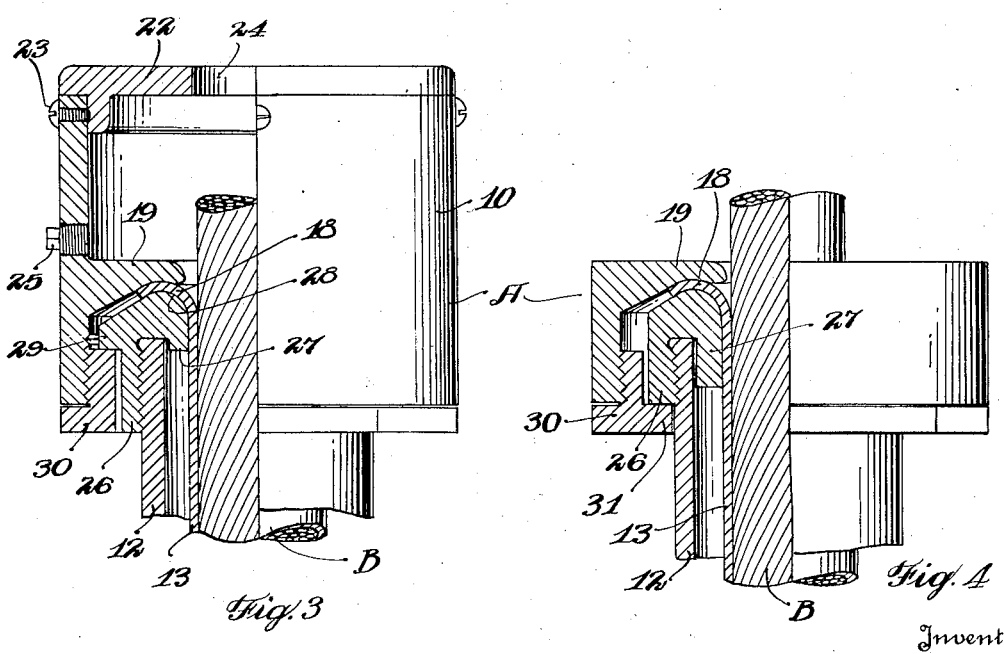
Inventor
Nicholas G Polgov
By [signature]
Attorney Patented Sept. 17, 1935

2,014,635

UNITED STATES PATENT OFFICE 2,014,635

CABLE TERMINATOR

Nicholas G. Polgov, Chicago, Ill., assignor to Delta-Star Electric Company, Chicago, Ill., a corporation of Illinois Application April 16, 1931, Serial No. 530,524

7 Claims. (Cl. 247—6)

This invention is a cable terminator or pothead designed to support the cable in a unique and simplified manner to provide a method of terminating lead covered electric cables where they emerge from conduits. In such constructions it is customary to remove the lead sheath down to a point where the cable leaves the conduit and then flare out and clamp a portion of the lead sheath in oil tight relation with the housing extending above the conduit, then filling the housing with insulation compound to prevent the entrance of moisture. A space for additional insulating means is provided at the top of the housing to allow the exit of the cable from which the sheath has been removed.

This terminator is designed to simplify the means of providing a cable terminator or pothead and does away with the necessity of threading the housing nippling connection. This is accomplished in this terminator by forming the nipple so as to fit snugly within the conduit without the necessity of threading and thereby serving as an internal spacer to prevent the cable from chaffing against the sides of the conduit. The nipple also reinforces the flared portion of the sheath so that there is less danger of stretching the clamp portion of the sheath. This simplifies the structure so that the diameter of the housing of the terminator or pothead may be materially reduced. It is preferred that the bushing be made of bronze owing to its advantage of resisting corrosion, however, the bushing may be made of any suitable material.

The advantage of the compact terminator housing will be very apparent in electrical installation work as it will be noted that several of these terminators or potheads may be mounted adjacent to one another with much less distance between their center lines, and thus I accomplish very important results where many conduits are brought up behind switchboards where there is very little room to spare if the cables are to come up as close as possible to the equipment to which they are connected.

This simplified structure provides a terminator or pothead with a single set of threads for assembling to the conduit.

While the preferred form is characterized by the simplest structure and nature, there are certain modifications which may be best set forth in conjunction with this form of terminator or pothead and having the same characteristics and functions to accomplish the desired results over the prior art structures which were of a more complicated nature.

The drawing illustrates the preferred form of my cable terminator or pothead in Figure 1.

Figure 2 illustrates a cross-section of the pothead illustrated in Figure 1.

Figure 3 illustrates a modified form of terminator or pothead, partly in section.

Figure 4 illustrates another modification of my electrical cable terminator.

The pothead or electrical cable terminator A is designed with a housing 10 formed of suitable material which is adapted to be connected by the single thread 11 to the conduit 12. The electrical cable B covered with the lead sheating 13 extends up into the cable terminator or pothead A as illustrated in Figure 2.

A small nipple 14 is formed in a manner to fit snugly within the conduit 12 in the casing 10 of the terminator A. This nipple may best be formed of bronze or other similar corrosive resisting material. The nipple 14 is formed with a collar portion 15 adapted to rest against the end 16 of the conduit 12 so as to provide a supporting shoulder for the nipple 14. An arcuated sheathing engaging surface 17 is formed on the collar end of the nipple 14 and the flared portion 18 of the lead sheathing 13 is adapted to lie over this arcuated surface 17. The casing 10 of the terminator A is formed with an inwardly extending annular flange 19 which also is provided with a complemental sheathing engaging arcuated surface 20, so that when the bushing or nipple 14 is in place and the lead sheathing laid over the same, the casing 10 may then be screwed down onto the threads 11 to tightly engage the lead sheathing between the nipple or bushing 14 and the inwardly extending flange 19 of the terminator or pothead A. A sufficiently large space 21 is provided in the head of the casing of the terminator A for additional insulating material. This space is filled with insulating compound to prevent the entrance of moisture around that portion of the cable B where the lead sheathing terminates, thus sealing the end of the cable with its sheathing in the terminator.

A suitable cover 22 is provided for the pothead or terminator A which may be held by the set screws 23. An opening 24 is formed in the cover 22 to provide the proper electric connection from the terminator. An insulating compound filling plug 25 is provided in the side of the casing 10. This simplified form of pothead or terminator A will clearly illustrate the compact nature of the same where the casing 10 may be formed slightly larger than the conduit 12 so as to engage over the same and acting to perform the necessary functions in providing a terminator or pothead for the cable where the sheathing is laid back away from the same, thus effectively sealing the cable to prevent the entrance of moisture. This small compact terminator permits the conduits 12 to come up close together and in a much smaller space an effective pothead or terminator is accomplished with the structure just defined.

The terminator may be formed in the nature of the structure such as C, where the casing 10 is slightly larger and the nipple 26 is formed of a nature to thread onto the conduit 12 with an overhanging lip 27 extending within the open end of the conduit 12. The lead sheathing engaging arcuated surface 28 extends up above the inwardly extending lip 27 and an outwardly extending shoulder portion 29 is formed thereon which rests upon the inner edge of the locking nut collar 30. The collar 30 is threaded into the lower end of the casing 10. In this construction the casing 10 is provided with an inwardly extending annular sheathing engaging flange 10 which clamps the end 18 of the lead sheathing rigidly in place.

The pothead or terminator may be in the form illustrated in Figure 4, where the nipple or bushing 26 is threaded to the conduit 12 and formed with the long inwardly extending annular lip 27 which extends freely down into the conduit 12. In this form the nipple 26 is not provided with the outwardly projecting shoulder 29 but is engaged by an inwardly projecting shoulder portion 31 formed on the collar nut 30 which is threaded into the bottom of the casing 10.

The terminator A is designed to overcome large bulky structures such as have been used in terminators heretofore, and to simplify the means of providing a pothead to seal the terminating end of an electric cable to hold the lead sheathing with an internal spacer to prevent the cable from chaffing against the sides of the conduit and at the same time reinforce the flared-over portion of the sheath so that there is less danger of stretching the clamp portion of this lead sheathing. All of this is accomplished with a material reduction in the size of the housing of the pothead or terminator. This structure permits a number of conduits to be brought up in a small space in relation to switchboards or in other places where there is very little room to spare and the structure further permits the terminator or pothead to be brought closer to the point of connection.

The modifications of terminators or potheads illustrated in Figures 3 and 4 of the drawing have one important advantage over the type illustrated in Figures 1 and 2. The pothead illustrated in the first two figures is provided with a housing which must be rotated in order to clamp the lead sheath of the cable. In the modifications of Figures 3 and 4, the construction is so devised as to obviate the necessity of rotating the housing 10. In these modifications the nut 30 is tightened into the casing which is held stationary. This is especially important with the use of thin lead sheaths where there is a danger of breaking or splitting the sheath by rotation of the housing or rotation of one of the clamping surfaces.

The housing in Figure 4 is broken away as it is not necessary to inclose the cable above the clamp for the lead sheath. In this form the housing is bolted or secured directly to the metal housing in which the terminator is positioned.

The terminator and pothead has been described in accordance with the patent statutes and it is believed that the best embodiment thereof is illustrated in the form shown in the drawing, however, the terminator should be considered within the scope of the following claims.

I claim:

1. A terminator comprising, a housing threaded to a conduit from which an electric cable extends, a nipple extending in close relation to the outer surface of the sheathing of the cable and to the inner surface of the conduit and having a sheathing engaging surface formed thereon, and an annular flange projecting inside of said housing to clamp the lead sheathing to said nipple and preventing chaffing in the conduit at the termination thereof.

2. The combination, an electric cable having a lead sheathing, a conduit out of which said cable emerges, a nipple extending into said conduit to fit closely the inner surface of the conduit and the outer surface of the lead sheathing, a housing adapted to be secured to the end of said conduit and having a shoulder formed in a manner to clamp the lead sheathing against said nipple to form a compact cable terminator.

3. The combination, an electric cable having a lead sheathing thereabout, a conduit out of which said cable is adapted to extend, a filler nipple formed of bronze having a portion adapted to extend into said conduit to provide a filler between said sheathing and the end of said conduit, said filler resting upon the end of said conduit, and a housing formed with a sheathing engaging shoulder and adapted to be connected to said conduit to clamp the sheathing between the shoulder and said filler.

4. An electric cable terminator including, a filler nipple formed of non-corrosive material adapted to fit between the lead sheathing of the electric cable, and the terminating end of the conduit extending about the cable, a pothead housing adapted to extend over the terminating end of the conduit and cable to provide a housing for receiving insulating material to seal the terminating end of the sheathing of the electrical cable, and a shoulder in said housing adapted to provide clamping means for holding the terminating end of the sheathing clamped to said nipple.

5. An electric cable terminator including, a housing, a cover for said housing, a conduit receiving end formed in said housing, a lead sheathing clamping shoulder carried by said housing, and a filler sheathing and spacer nipple extending into the conduit and in close relation to the sheathing of the electrical cable and adapted to co-operate with said shoulder to clamp the end of the sheathing.

6. An electric terminator comprising, a housing, a clamping shoulder for engaging the sheathing of the cable carried by said housing, a cover for said housing, an open end for receiving the conduit from which the electric cable emerges, a spacing nipple having means for spacing the sheathing of the electric cable from the end of the conduit to prevent chaffing and means for clamping said nipple in said housing and in relation to the conduit in a manner whereby said nipple co-operates with said shoulder to clamp the end of the sheathing of the cable.

7. An electric cable terminator including, a housing having a cylindrical nature, a conduit from which an electric cable emerges, said housing having a diameter just large enough to be threaded to the outer end of the conduit, an annular inner shoulder carried by said housing for engaging the sheathing of the electrical cable, and a filler spacer nipple extending into said conduit and resting upon the end thereof, adapted to co-operate with said shoulder and said housing to clamp the end of the sheathing about said cable.

NICHOLAS G. POLGOV.